May 4, 1965  L. D. BEST  3,181,754
CAR SUIT CARRIER
Filed May 17, 1962  2 Sheets-Sheet 1
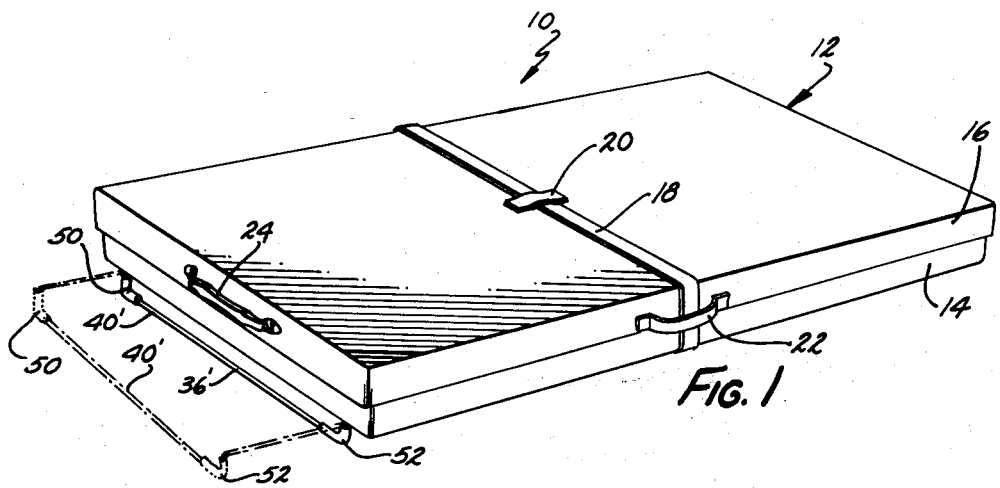
FIG. 1
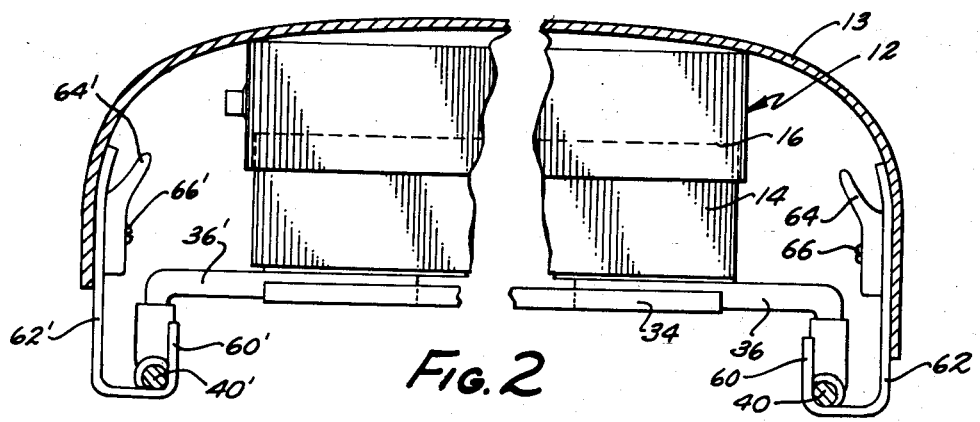
FIG. 2
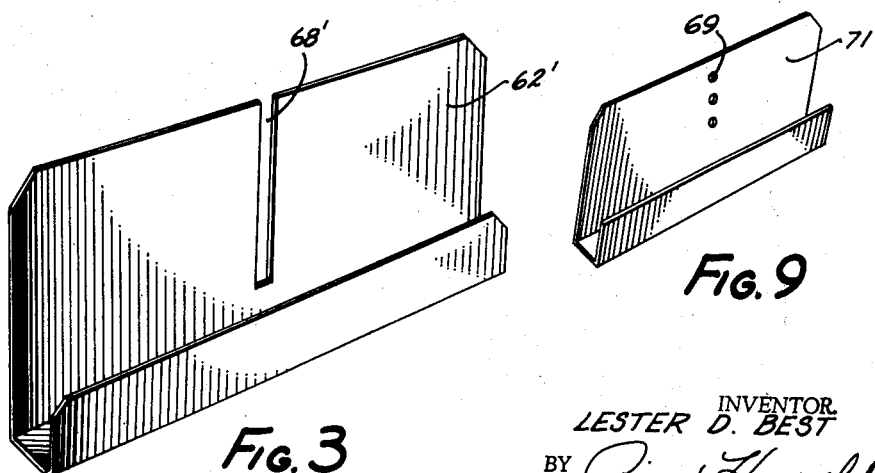
FIG. 3
FIG. 9
INVENTOR.
LESTER D. BEST
BY
ATTORNEYS

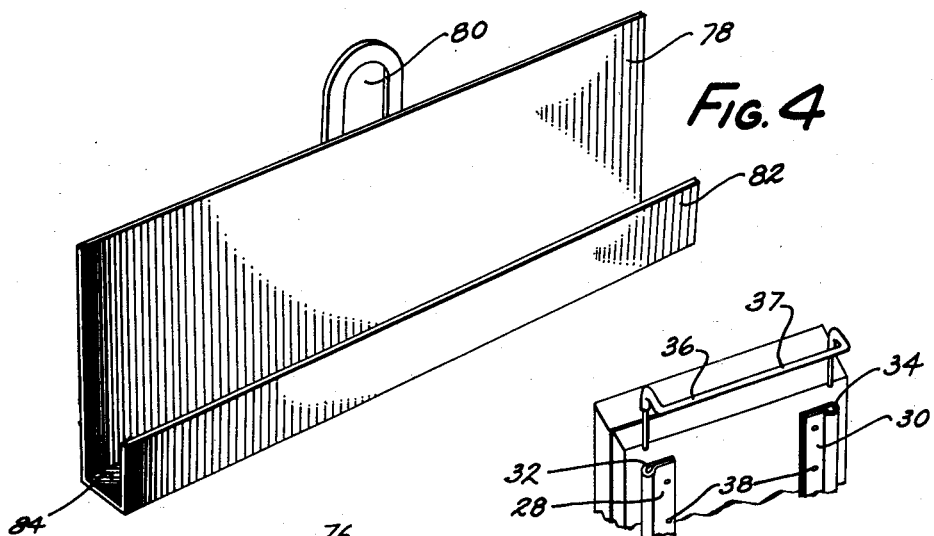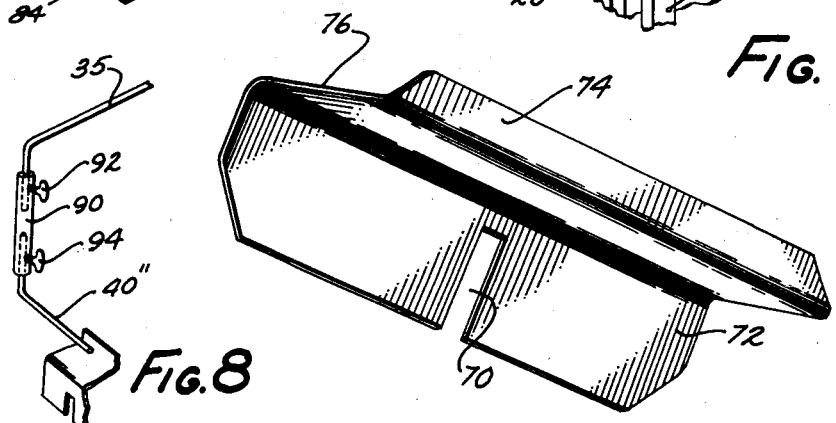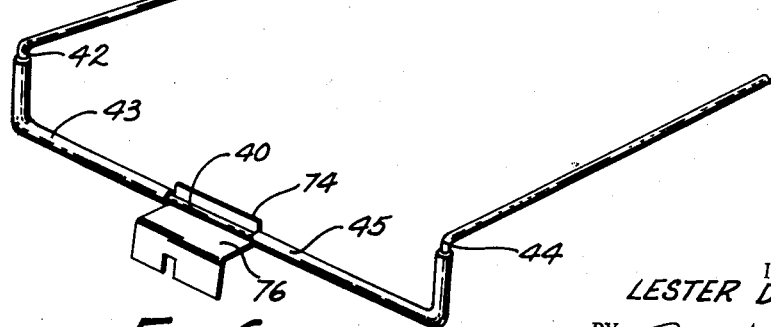

United States Patent Office 3,181,754
Patented May 4, 1965

3,181,754
CAR SUIT CARRIER
Lester D. Best, 117 Youell SE., Grand Rapids, Mich.
Filed May 17, 1962, Ser. No. 195,496
15 Claims. (Cl. 224—29)

This invention relates to travelling cases and bracket means for supporting them in an automobile, and more particularly to a travelling case apparatus adapted to be mounted against the inside of the roof in an automobile.

When travelling, it often becomes desirable to have space in addition to the trunk for holding clothes and/or other articles in neat array, especially in compact cars. Luggage containers adapted for mounting on the outside of an automobile are not too desirable, since they are subject to adverse weather, are inviting to thieves and hinder proper wind flow over the automobile.

Heretofore, it has been proposed to support articles inside the automobile on brackets suspended from the cloth or plastic beading that connects the cloth or plastic lining material in some automobiles. However, loads which can be supported by this flexible beading are definitely limited. Moreover, this type of arrangement is prone to cause ripping of the interior lining, among other disadvantages.

Another type of clothes support is the hanging type. A drawback of these is that the position of the clothes causes them to be in obvious sight from the exterior of the automobile, thereby being an attraction for thieves. They also obstruct the view of the driver and passengers, as well as using seat space. Further, clothes openly hung in the car are subject to wrinkling, to being wind blown, etc. Further, hanger type supports are not ordinarily capable of supporting articles other than clothes.

It is an object of this invention to provide a travelling case that is normally completely out of sight from the exterior of the automobile when properly positioned in its mounted position. Moreover, the novel apparatus enables storage of many articles such as suits, dresses, etc. without obstructing the vision of either the automobile driver or passenger.

It is another object of this invention to provide an article carrying case and mounting means for the inside of an automobile that is capable of supporting either a very few or a large number of articles without damage to parts of the automobile or to the apparatus, and without excessive wrinkling or blowing of the articles. The novel apparatus is variably expandable to accommodate the desired amount of goods, and the desired type of goods whether or not they are clothes. It holds the articles in a neat, protected manner. The article carrying case can be readily mounted or easily removed and used as a suitcase.

It is another object of this invention to provide a sturdy bracket assembly enabling quick attachment of the article supporting means to conventional clothes support hooks mounted fixedly on the side of the automobile, usually above the rear doors or rear side windows, so as to hold the article carrying case against the roof of the automobile for safe, sturdy, neat storage.

It is a still further object of this invention to provide a bracket assembly of the type described which is variable in width and in height to accommodate different automobiles, and varying amounts of clothing or other articles.

Other objects and advantages of this invention will be apparent upon studying the following specification in conjunction with the drawings, in which:

FIG. 1 is a perspective view of the novel carrying case showing one of the extensible support means attached to the case;

FIG. 2 is a fragmentary, sectional view through the roof of an automobile showing the carrying case and novel bracket and support means in position on conventional clothes hooks of an automobile;

FIG. 3 is a perspective enlarged view of one of the bracket elements usable with this invention;

FIG. 4 is a fragmentary view of a second form of bracket usable with this invention;

FIG. 5 is a third form of bracket which can be suspended from the automobile hook and used with this invention;

FIG. 6 is a perspective view of one form of the support means mountable to the carrying case and supported by the brackets in FIGS. 3, 4 or 5 in a manner illustrated in FIG. 2;

FIG. 7 is a fragmentary, perspective view of the underside of one end of the carrying case showing the support means extensible therewith;

FIG. 8 is a fragmentary, perspective view of a modified form of the support element shown in FIG. 6; and FIG. 9 is a perspective view showing a still further modification of the bracket.

Basically, the invention comprises a platform—which may be encased to form a travel case—and bracket support means for an automobile capable of suspension in a position against the inside of the roof of the automobile. It is adapted to be suspended from conventional side mounted support hooks in the automobile. The bracket and support means includes a pair of bracket elements adapted to be suspended from the conventional clothes hooks, preferably by an orifice or slot means interfitting with conventional hanger hooks. The support means includes portions extending between the bracket elements and adapted to support a carrying case mounted thereon. The support means are preferably extensible in length, i.e. across the width of an automobile, and variable in height to accommodate different size automobiles and different amounts of articles in the carrying case. The carrying case preferably includes a telescopic cover means to accommodate varying amounts of articles. It preferably includes handle means enabling it to be carried in a manner similar to a suitcase. The support means for the carrying case comprises a pair of U-shaped elements having legs fitting into receiving grooves of support sockets attached to the underside of the case. The crossbars of the U-shaped elements are each supported by the respective suspended brackets on opposite sides of the automobile.

Referring to the drawings, the novel carrying case and bracket and support apparatus 10 includes carrying case 12, brackets 62 and 62' suspended from conventional automobile hooks 64 and 64', U-shaped support elements 36 and 36' and support socket means 32 and 34 attached to the case 12. The carrying case 12 is adapted to be mounted against the roof 13 of an automobile due to support between sockets 32 and 34 interfitting with the parallel legs of the pair of U-shaped elements 36 and 36', the cross legs 40 and 40' of which interfit with brackets 62 and 62' suspended from conventional automobile hooks 64 and 64'.

The carrying case 12 has a generally tray-shaped bottom 14 for receiving articles therein, and a telescopically fitting cover 16. The case is preferably almost as wide as the width of the automobile in which the case is to be mounted. A strap 18, positioned by a plurality of loops 20 and fastened by a suitable buckle means (not shown), may be utilized to hold the case closed. The case preferably includes handle means 22 on the front enabling the case to be carried in a manner similar to a suitcase. Also, a handle 24 may be placed on the end, if desired.

On the bottom side of the case is a pair of elongated support means 28 and 30 (FIG. 7) which have rolled edges forming a pair of elongated tubular, rod-receiving grooves or sockets 32 and 34. Elements 28 and 30 may extend the entire length of the carrying case 12 or may comprise a pair of short portions on each end of the carrying case. The important factor is that they be adapted to receive the parallel legs of U-shaped elements 36 and 36'. Elements 28 and 30 are preferably mounted directly to the tray 14 as by screws 38.

The parallel legs of the two U-shaped elements 36 and 36' are insertable into the sockets 32 and 34 on opposite ends of the carrying case in the manner illustrated in FIG. 2. The cross legs 40 of each U-shaped element is preferably offset vertically from the plane of the parallel legs by a pair of vertical extensions 42 and 44. By inverting the U-shaped elements, it will be seen that the height of the carrying case can be varied a few inches with respect to the automobile roof. The cross legs also form feet because of this offset enabling the case to be rested on the ground in an elevated manner since only cross legs 40 and 40' contact the ground. Preferably, tubular rubber or plastic pads 50 and 52 are placed around the ends of the cross legs 40 and 40'. Since the parallel legs of the U-shaped elements or rods 36 and 36' fit within sockets 32 and 34 in a slidable manner, they may be variably extended, as illustrated for example in phantom in FIG. 1, to give the exact width needed to fit any particular automobile.

The cross legs 40 and 40' are adapted to rest and be supported on surface 76 and 76' behind flanges 60 and 60' of the generally J-shaped bracket elements 62 and 62', respectively. Each of these brackets is mounted to the conventional automobile hanger hooks 64 and 64', which are ordinarily affixed directly to the automobile by suitable screws 66 and 66' in a known manner. This bracket may vary somewhat in configuration and in the method of attachment to the automobile hanger hook. For example, the bracket illustrated in FIG. 2 and shown more specifically in FIG. 3 includes an elongated, vertical slot 68' at the top of the back. The bracket fits under the hanger hook 64'. To do so, screw 66' is loosened, and the bracket is slid thereunder, whereupon the screw passes through the slot. Then the screw is retightened. Instead of a slot, a plurality of vertically spaced holes or openings 69 (FIG. 9) can be drilled or stamped into the back 71 of the bracket. In that case, the screws 66 and 66' would be removed and replaced. This latter type could not possibly slip out from behind the hooks under a heavy load. Both types would provide vertical adjustment of the bracket with respect to the hooks. With the slot type, it could be slid to the desired height before tightening the screw. With the series of holes-type, the screw could be placed in the desired hole to vertically vary the bracket height.

Alternatively, a bracket such as that illustrated in FIGS. 5 and 6 may be utilized. It has a generally Z-shaped configuration to fit over the top of the automobile hook 64'. The screw 66' can pass through vertical slot 70 extending upwardly from the bottom edge of bracket 72. Here again, an upwardly directed flange 74 serves to retain the cross leg 40 of the U-shaped element 36 from slipping off horizontal support surface 76, as illustrated in phantom in FIG. 6. It will be noted that in each of these two embodiments of the bracket shown, it is necessary to loosen the screws 66' holding the automobile hook 64' to the automobile body. It may sometimes be desirable to use a bracket such as that illustrated in FIG. 4 which is also generally of a J-shape, and includes a generally open-ended slot at the bottom to receive the cross leg of the U, but includes a slot or orifice means 80 which essentially is a loop element enabling it to be hooked over the automobile hook. In this instance the slot interfits with the hook, not the screw, and the screw need not be loosened. Thus, the term "slot" or "orifice means" as used in this specification and in the claims is intended to include this loop-type configuration and all equivalents.

The loop may be formed integral with the sheet metal J-shaped bracket 78, or may be connected to the back thereof as by welding or the like. Here again, an outwardly turned flange 82 serves to provide a groove or channel 84 to receive the cross leg of a U-shaped member.

It will be noted that in the U-shaped element illustrated in FIG. 6, the rubber covers or pad portions 43 and 45 extend right up to the edge of the bracket 76, thereby preventing any forward or rearward movement of the U-shaped element with respect to the bracket. Movement is also prevented by pressure of the case 12 against the top of the car as explained hereinbefore. Alternatively, the rubber may extend clear across the cross leg of the U-shaped element as illustrated by the continuous coating 37 in FIG. 7. This prevents any possible noise between the metal surfaces of the U supports and the brackets.

If desired, vertical adjustment may be obtained of the U-shaped element not only by inverting them to cause the offset portions 42 and 44 to be directed downwardly or upwardly, but adjustment may also be had by utilizing a U-shaped element having variable offset portions as illustrated in FIG. 8. Here the parallel legs 35 in FIG. 8 and cross leg 40" are formed separately and connected together by a hollow collar 90 into which the ends of legs 35 and 40" fit. A pair of set screws 92 and 94 enable adjustment of the legs with respect to the collar. Obviously, two of these collars will be used on the two offsets of each U-shaped member, thus making four collars on the complete apparatus. This latter type of support element is especially useful with the loop-type of bracket shown in FIG. 4.

Operation

The case 12 can be carried in a manner similar to a suitcase by lifting it with handle 22. When it is desired to put articles in the case, for example, several suits, dresses, overcoats, or toys, tools or some other article, strap 18 is unbuckled and removed. Cover 16 is lifted from tray 14. The articles are placed within the tray and cover 16 is replaced. Since the cover is telescopic with respect to the tray, it will readily accommodate the articles. For example, the inventor has successfully utilized the device to carry twelve garments, including a winter coat. The U-shaped elements 36 and 36' are then connected to the carrying case by inserting the parallel legs within sockets 32 and 34. Then one end of the carrying case 12 is hoisted against the roof 13 of the automobile and cross leg 40 is placed in bracket 62. The bracket is attached to the respective automobile hook. Then the other end of the case is hoisted against the roof. Cross leg 40' of the support element 36' is interfit with bracket 62', and the latter is connected to its respective hook 64'.

When utilizing the bracket shown in FIG. 4, the entire assembly including carrying case, socket, U-shaped elements, and brackets may be assembled and then merely hoisted and hooked over the hook element.

Various other obvious modifications of the apparatus to suit particular types of carrying cases and within the principles of this invention may occur to those in the art upon studying the foregoing teachings and illustrative forms of the invention depicted. These obvious modifications are deemed to be part of this invention which is to be limited only by the scope of the appended claims and the reasonably equivalent structures thereto.

I claim:

1. An article carrier for carrying articles within an automobile along the underside of its roof, comprising: a relatively flat article-supporting surface of substantial area; bracket means releasably attachable to the coat hangers of an automobile; and extensible support means attached to the underside of said surface and arranged to be supportingly engaged by said bracket means when deposited thereon.

2. A travel case for the interior of automobiles, comprising: a relatively flat article-receiving tray; a removable cover telescopable over said tray; bracket means releasably attachable to the coat hangers of an automobile; and extensible support means attached to the underside of said tray and arranged to be supportingly engaged by said bracket means when deposited thereon.

3. A travel case for the interior of automobiles, comprising: a relatively flat article-receiving tray; a removable cover telescopable over said tray; bracket means releasably attachable to the coat hangers of an automobile; said bracket means having an elongated supporting surface formed thereon; a pair of spaced rod-receiving elements attached to the underside of said tray; a U-shaped rod whose legs are longitudinally slidably received by said rod-receiving means; the crossbar of said rod being adapted to rest on said bracket supporting surface and be supported thereby against tilting movement.

4. The device of claim 3, in which said bracket means include a generally Z-shaped, elongated plate, one of the legs of the Z having an open-ended slot formed therein, said slot receiving the fastening screw of said coat hanger when said one leg is inserted between said coat hanger and the body of the automobile; the crossbar of the Z forming said supporting surface; and the other leg of the Z forming a retaining flange to prevent said rod from slipping off said supporting surface.

5. The device of claim 3, in which said bracket means includes a generally J-shaped, elongated plate, the long arm of the J having an opening formed therein for receiving the fastening screw of said coat hanger; the crossbar of the J forming said supporting surface, and the short arm of the J forming a retaining flange to prevent said rod from slipping off said supporting surface.

6. The device of claim 3, in which said bracket means includes an elongated trough, and eye means extending upwardly from one side of said trough, said eye means being adapted to engage said coat hanger and be supported thereby.

7. The device of claim 3, wherein said bracket means further includes a flanged end upstanding from said supporting surface for engaging the spaced legs of the U-shaped rod upon excessive axial movement of said crossbar to prevent said crossbar from axially slipping off said supporting surface.

8. The device of claim 3, in which a resilient material is interposed between said crossbar and said trough to prevent axial movement of said crossbar with respect to said bracket.

9. A travel case for the interior of automobiles, comprising: a relatively flat article-receiving tray; a removable cover telescopable over said tray; bracket means adapted to be releasably attached to the clothes hooks of an automobile; said bracket means having an elongated trough formed thereon; a pair of spaced parallel tubes extending longitudinally along a major portion of the underside of said tray; a pair of U-shaped rods having legs telescopingly received in corresponding ends of said tubes; the crossbar of said rod being adapted to rest in said trough for support thereby against tilting movement.

10. A travel case for automobiles, comprising: a relatively flat article-receiving tray; a removable cover telescopable over said tray; bracket means releasably attachable to the coat hangers of an automobile; said bracket means having an elongated trough formed thereon; a pair of spaced parallel tubes extending longitudinally along a major portion of the underside of said tray; a pair of U-shaped rods having legs telescopingly received in corresponding ends of said tubes; the crossbar of said rod being parallel to but spaced from the plane of said legs and being adapted to rest in said trough for support thereby against tilting movement; carrying handles on said cover; strap means attached to said tray for securing said cover to said tray; and resilient material on said crossbar to prevent axial movement of said crossbar with respect to said bracket.

11. A travel case capable of suspension against the ceiling of an automobile from conventional clothes hanger hooks therein, comprising: an article-receiving case; case support means extending from opposite sides of said case; a pair of brackets having means to releasably attach said bracket to conventional clothes hanger hooks in an automobile; and said brackets cooperating with said case support means to support and hold said case against the ceiling of said automobile when said brackets are releasably attached to said clothes hanger hooks.

12. The apparatus in claim 11 wherein said case support means are variably extensible from said case.

13. The apparatus in claim 12 wherein said brackets include slot means adapted to receive portions of said support means.

14. A travel case capable of suspension adjacent the ceiling of an automobile from conventional clothes hanger hooks therein, comprising: an article-receiving case; case support means extending from opposite sides of said case; a pair of brackets having means for releasably suspending said bracket from conventional clothes hanger hooks on opposite sides of an automobile; and said brackets cooperating with said case support means to support said case adjacent the ceiling of said automobile when said brackets are suspended from said clothes hanger hooks.

15. A travel case capable of suspension adjacent the ceiling of an automobile from conventional clothes hanger hooks therein, comprising: an article-receiving case; case support means having socket portions and rod portions, said socket portions being mounted to said case and said rod portions inserted into the socket portions and extending therefrom beyond the opposite sides of said case; a pair of brackets having means for releasably suspending the same from conventional clothes hanger hooks on opposite sides of an automobile; and said brackets having slot means adapted to receive said rod portions in a cooperative relationship, so as to support said case adjacent the roof of said automobile when said brackets are connected to said clothes hanger hooks.

References Cited by the Examiner

UNITED STATES PATENTS

| | | |
|---|---|---|
| 1,748,282 | 2/30 | Ellis. |
| 2,540,756 | 2/51 | Radcliffe _____ 220—69 X |
| 2,668,647 | 2/54 | Osburn et al. |
| 2,988,252 | 6/61 | Crane. |

FOREIGN PATENTS

| | | |
|---|---|---|
| 823,326 | 12/51 | Germany. |
| 816,323 | 7/59 | Great Britain. |

HUGO O. SCHULZ, *Primary Examiner.*

MORRIS TEMIN, *Examiner.*